(12) United States Patent
Ladd et al.

(10) Patent No.: US 9,711,765 B1
(45) Date of Patent: Jul. 18, 2017

(54) RAPID REPLACEMENT BATTERY SYSTEM

(71) Applicant: Ultralife Corporation, Newark, NY (US)

(72) Inventors: Jeffrey C. Ladd, Farmington, NY (US); John Domm, Rochester, NY (US); Michael Manna, Canandaigua, NY (US)

(73) Assignee: Ultralife Corporation, Newark, NY (US)

( * ) Notice: Subject to any disclaimer, the term of this patent is extended or adjusted under 35 U.S.C. 154(b) by 92 days.

(21) Appl. No.: 14/598,434

(22) Filed: Jan. 16, 2015

Related U.S. Application Data

(60) Provisional application No. 61/928,974, filed on Jan. 17, 2014.

(51) Int. Cl.
| | |
|---|---|
| *H01M 6/42* | (2006.01) |
| *H01M 2/10* | (2006.01) |
| *H01M 10/0525* | (2010.01) |
| *H01M 10/48* | (2006.01) |

(52) U.S. Cl.
CPC ...... *H01M 2/1022* (2013.01); *H01M 10/0525* (2013.01); *H01M 10/48* (2013.01); *H01M 2220/30* (2013.01)

(58) Field of Classification Search
CPC ...... H01M 2/02; H01M 2/0217; H01M 2/022; H01M 2/0242; H01M 2/1005; H01M 2/1022; H01M 2/1077; H01M 10/62
See application file for complete search history.

(56) References Cited

U.S. PATENT DOCUMENTS

| | | | |
|---|---|---|---|
| 4,849,682 A | 7/1989 | Bauer et al. | |
| 5,413,499 A * | 5/1995 | Wright, Jr. | .......... H01M 2/1066 429/1 |
| 7,782,607 B2 | 8/2010 | Harbin et al. | |
| 8,398,408 B1 | 3/2013 | Hansen et al. | |
| 2007/0228680 A1 | 10/2007 | Reppert et al. | |
| 2008/0110460 A1 | 5/2008 | Elaz et al. | |
| 2010/0156184 A1 | 6/2010 | Ludtke | |
| 2010/0264738 A1 | 10/2010 | Murtha et al. | |
| 2011/0006724 A1 | 1/2011 | Reckelhoff | |
| 2013/0307550 A1* | 11/2013 | Densham | .......... H01M 10/482 324/433 |

FOREIGN PATENT DOCUMENTS

| | | |
|---|---|---|
| WO | WO2013163647 | 10/2013 |

OTHER PUBLICATIONS

International Search Report for PCT/US2013/038640 Aug. 23, 2013.

* cited by examiner

*Primary Examiner* — Patrick Ryan
*Assistant Examiner* — Ben Lewis
(74) *Attorney, Agent, or Firm* — Duane C. Basch; Basch & Nickerson LLP

(57) ABSTRACT

A replacement battery system design incorporating a pivoting battery holster and other features enabling one-handed battery removal for devices requiring a battery.

14 Claims, 9 Drawing Sheets

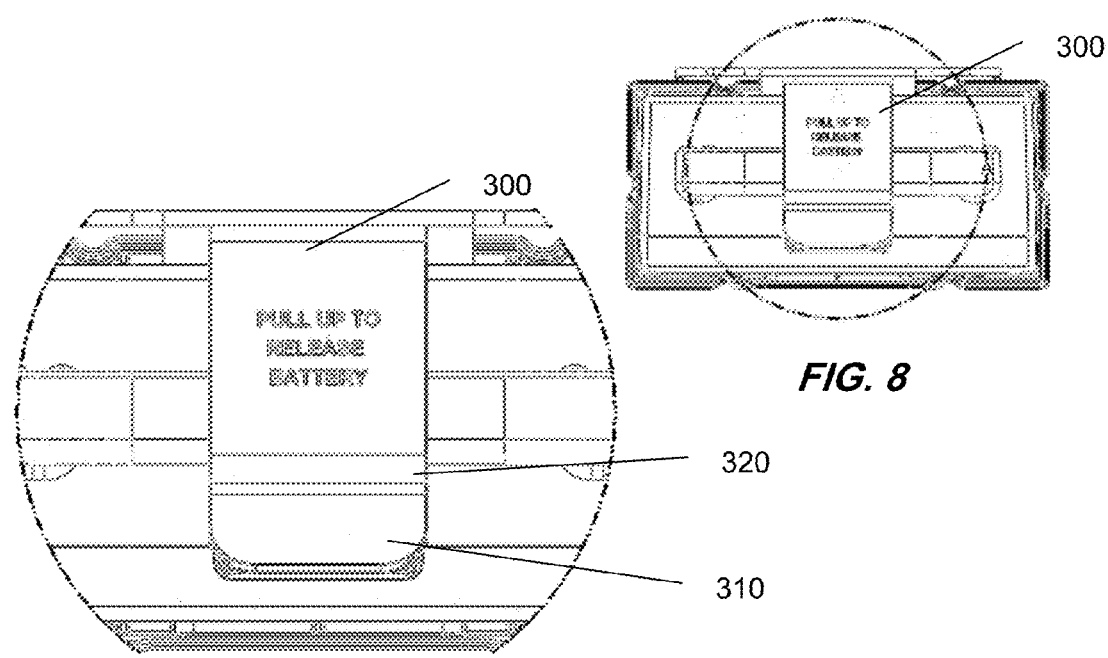

RAPID REPLACEMENT BATTERY SYSTEM

This application claims priority under 35 U.S.C. §119 from U.S. Provisional Patent Application No. 61/928,974 for a RAPID REPLACEMENT BATTERY SYSTEM, filed Jan. 17, 2014 by Jeffrey C. Ladd et al., which is hereby incorporated by reference in its entirety.

The embodiments discloser herein are directed to an improved battery replacement system, where the battery is connected to a device requiring power using a pivoting holster along with a latch that may be operated (e.g., released) using one hand. The disclosed embodiments permit the rapid removal and replacement of a battery for devices requiring a battery including, computers, radios, and other portable equipment.

BACKGROUND AND SUMMARY

One aspect of the disclosed battery system and pivoting holster is a battery pocket that allows for quick access and removal/replacement of a rechargeable battery pack.

Disclosed in embodiments herein is a battery power system for use in providing power to a device, comprising: a removable battery with a housing; and a battery holster for receiving said battery, where said holster is operatively connected to the device, and at least a portion of said holster pivots relative to the device to enable removal and insertion of the battery.

BRIEF DESCRIPTION OF THE DRAWINGS

FIG. 8 is a top view of the batter handle and holster latch mechanism, and

FIG. 9 is an enlarged section of FIG. 8

Figure 1:
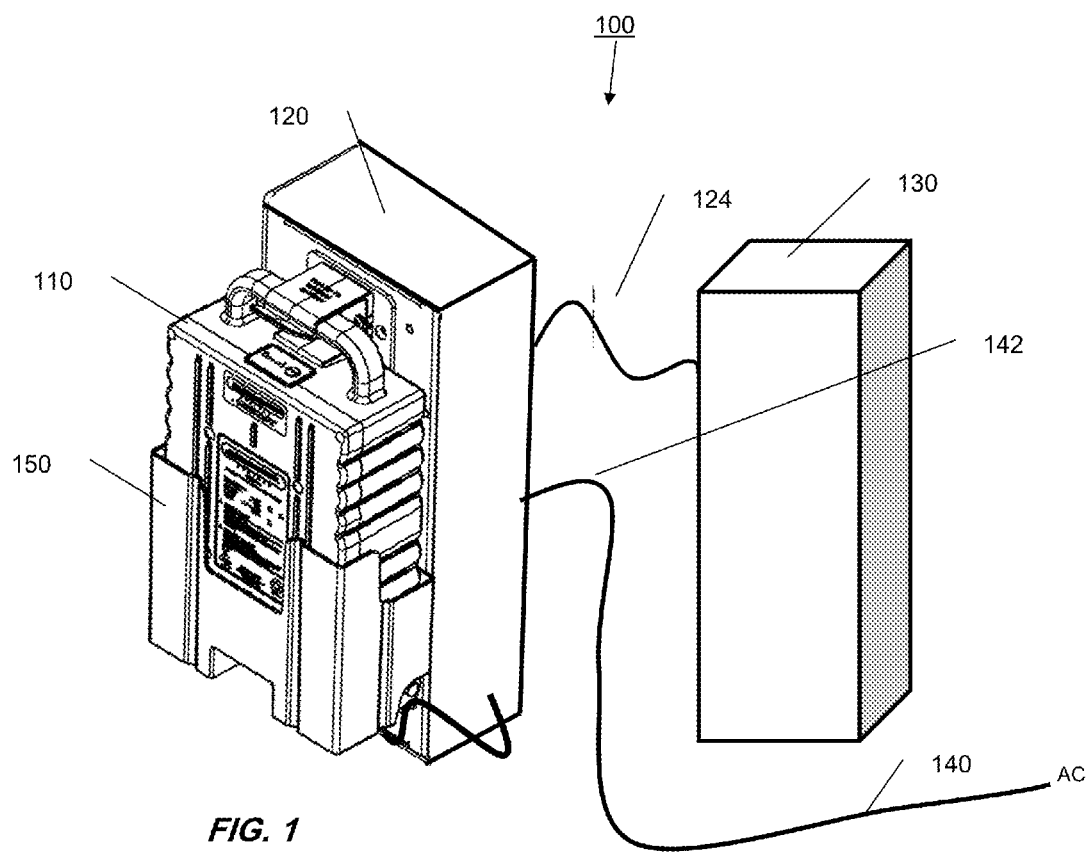
FIG. 1 is a perspective view of a battery power system.

The various embodiments described herein are not intended to limit the disclosure to those embodiments described. On the contrary, the intent is to cover all alternatives, modifications, and equivalents as may be included within the spirit and scope of the various embodiments and equivalents set forth. For a general understanding, reference is made to the drawings. In the drawings, like references have been used throughout to designate identical or similar elements. It is also noted that the drawings may not have been drawn to scale and that certain regions may have been purposely drawn disproportionately so that the features and aspects could be properly depicted.

DETAILED DESCRIPTION

In one embodiment, as depicted in FIG. 1, system 100 includes a removable battery 110, a charging/inverting system 120 and is physically attached, or at least electrically connected via cable 124, to a device 130 to provide operating or back-up power to the device. As described herein, various mobile power embodiments are contemplated including a portable computer, robots, mobile equipment, etc. where the removable battery provides power to the equipment while it is moved from one location to another (e.g., moving from room to room). Removable battery 110 is intended to be easily interchangeable and is configured to couple with the battery power supply electronics and/or charger (e.g. charger/inverter) 120 via a pivoting holster 150. AC power, for recharging battery 110 is provided to the power supply electronics and charger via a power cord 140 that is attached via a plug-type connector 142. When using device 130 of system 100, the battery docked in the holster 150 station may be removed in order to be swapped with a substitute or replacement battery.

One aspect of the disclosed battery system and pivoting holster is a battery pocket 156 that allows for quick access and removal/replacement of a rechargeable battery pack. The system includes a pivoting battery pocket 156 as part of the holster 150 to make the battery ergonomically easy to remove and replace as a one person operation. As will be described in detail, the battery holster rotates up or toward the structure to which it is attached and utilizes the battery handle to latch and lock the battery and holster into place. The battery pocket guides the battery into position, enabling a blind mating contact to be utilized on the battery. The battery pocket could be made out of metal or plastic or other material, with plastic being preferred due to reduction of weight and ease of color match to the installed powered device.

Figure 2:
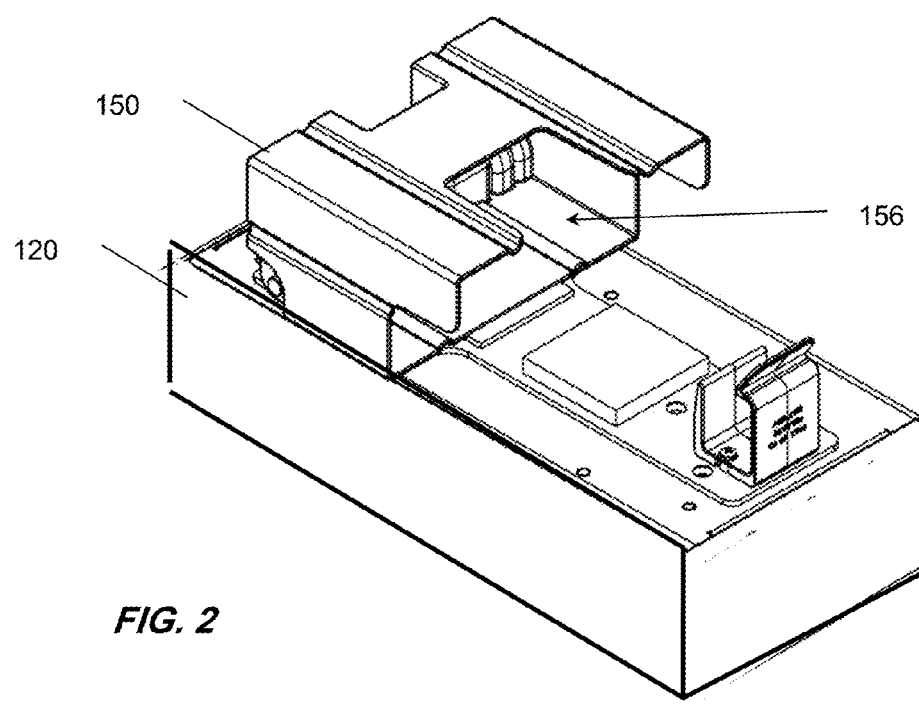
FIGS. 2-3 are illustrations of the battery and charger/inverter components from FIG. 1.
Figure 3:
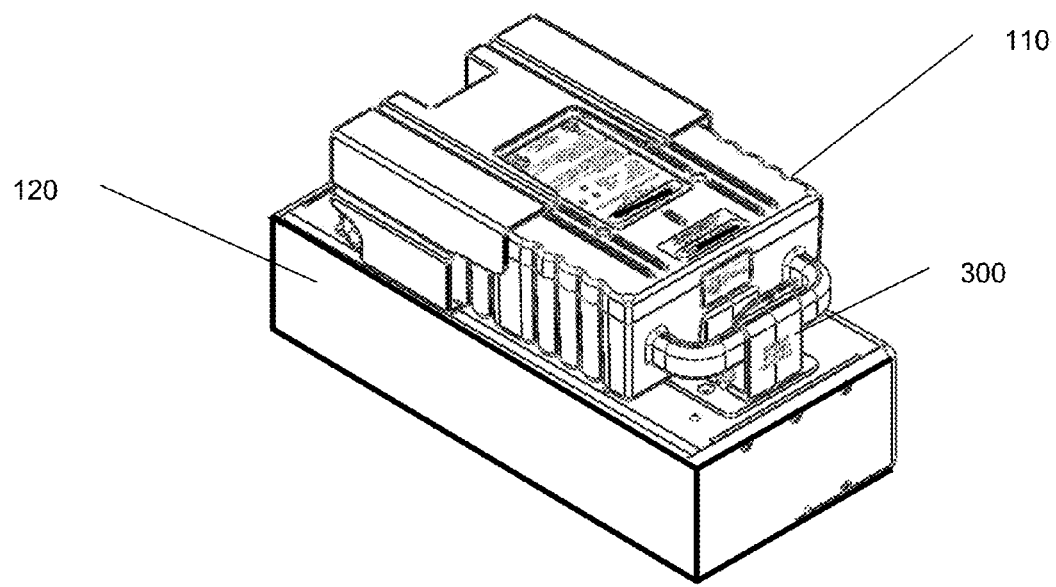
Figure 4:
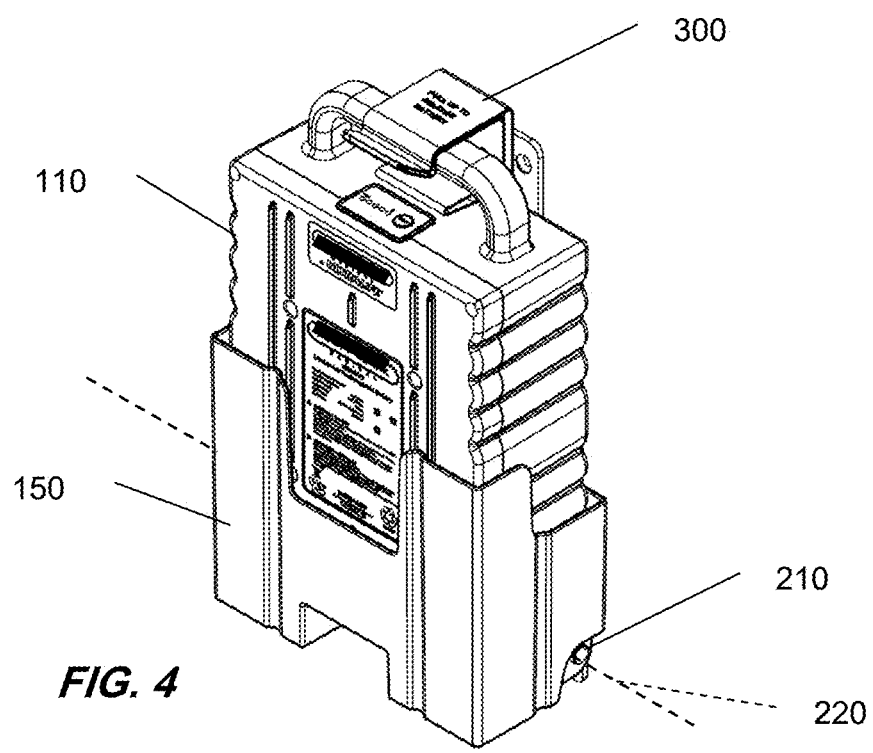
FIGS. 4-7 are illustrative views of the battery and associated holster.
Figure 5:
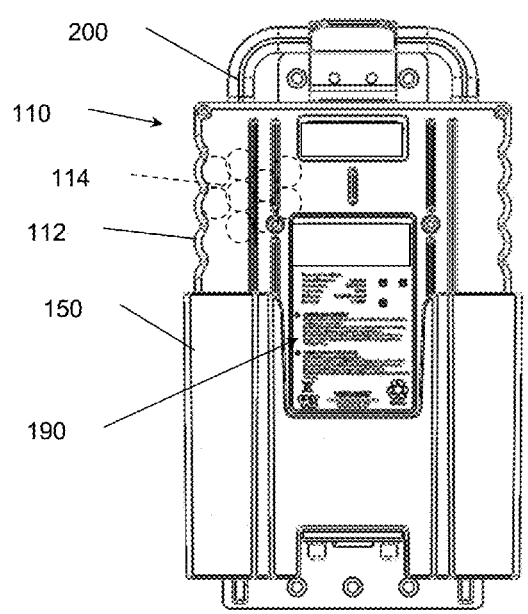
Figure 6:
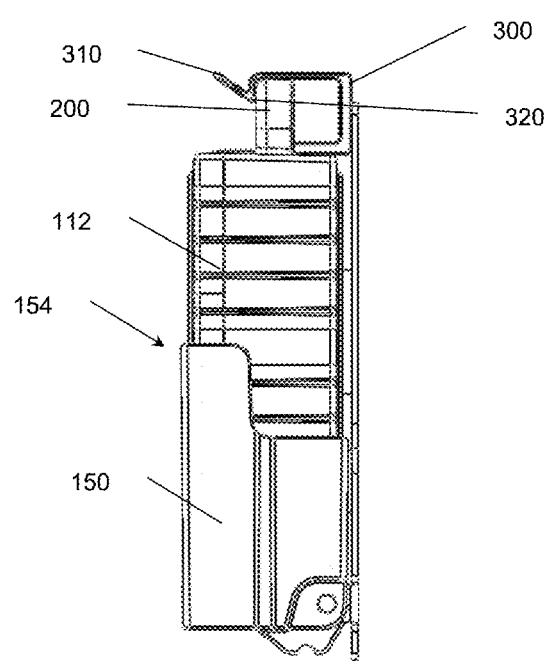

Also referring to FIGS. 2 and 3, depicted therein are illustrations of the battery power supply electronics and/o charger and holster. Although depicted in different orientations in the figures, the advantages of the disclosed embodiment may be achieved in a number of configurations, and a physical connection of the holster to the power supply electronics and/or charger is not necessarily required, although may be preferable to minimize the distance between the components of the system and to avoid losses due to extended battery cable length. One key feature of the disclosed pivoting holster is that the battery may be stored in a location having restricted clearance near the handle 200 of the battery 110. The pivoting holster, as further illustrated in FIG. 7, allows the handle of the battery to be pivoted outward or away from a limited clearance location for ease of insertion and removal of the battery. Accordingly, the use of the pivoting holster 150 enables installation of the battery under platforms or other structures for the device being powered, while also enabling its removal or replacement.

Holster 150, as seen in FIGS. 2-7, is in the form of a pocket or receptacle that is generally rectangular in cross-section and is sized to receive the bottom of battery 110. Battery 110 slides into and out of the holster 150, so that it is easily inserted into and removed from the holster pocket 156. As will be appreciated, the battery and holster may also include mating features so that one can be assured that the removable battery is inserted into the holster in an orientation that is correct in order to properly complete the electrical contacts present in the bottom of the pocket and on the base of the battery. As will be appreciated, with the mating connectors located in the pocket bottom along one side of the holster pocket and in a respective position on the battery, and no corresponding features on the opposite side, it is impossible for a user to insert the battery fully into the holster if it is not in the proper orientation for mating of the contacts.

Figure 7:
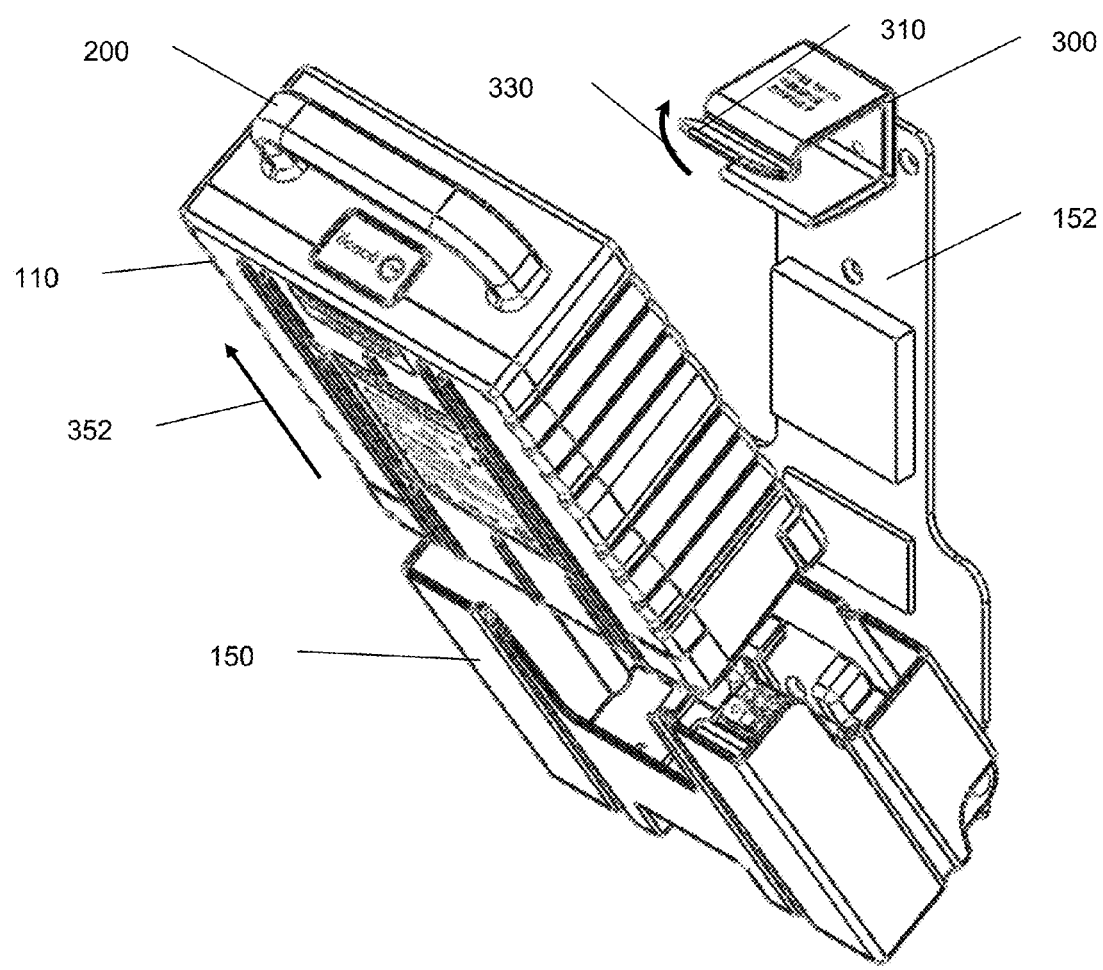
Figure 10:
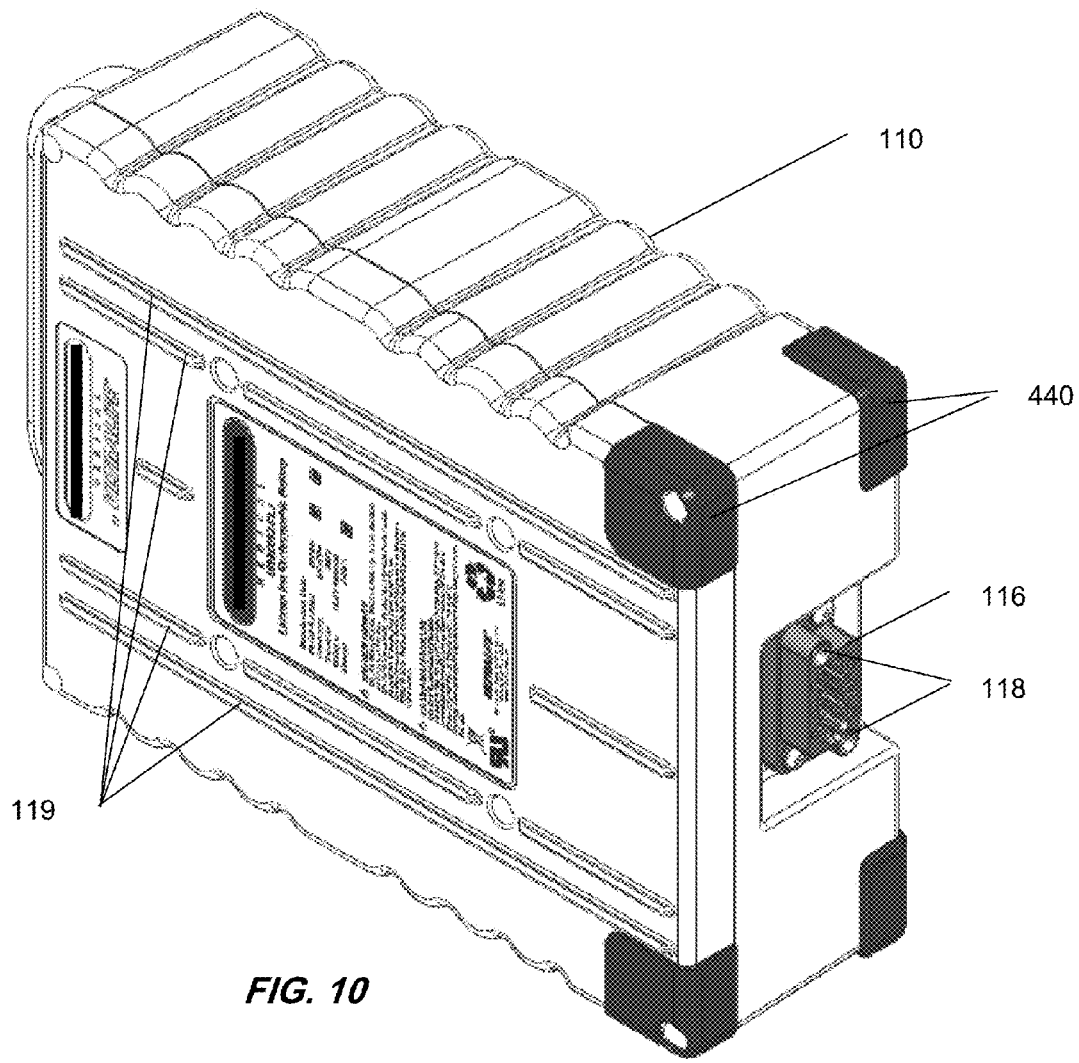
FIGS. 10-11 illustrate the over-molded corners of the battery housing.
Figure 11:
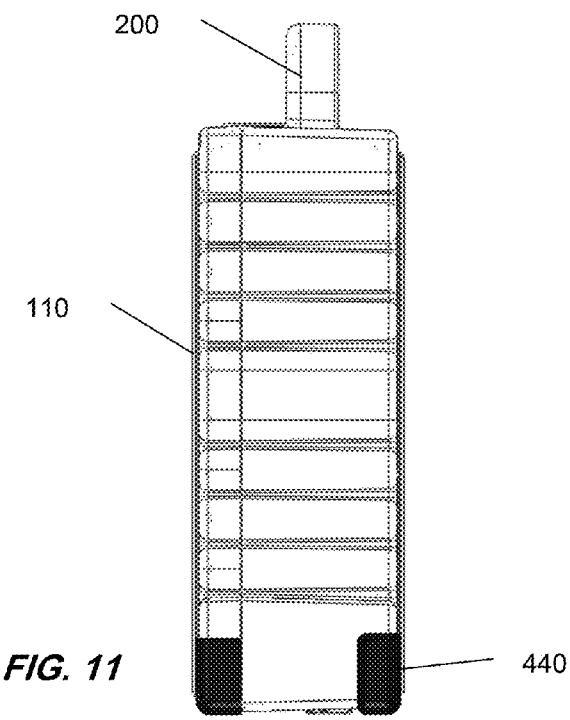

In the open position, as depicted in FIG. 7 for example, the holster swings or pivots away from the device or structure to which it is attached. Holster 150 pivots at hinge pins 210 around axis 220. In one embodiment, the holster pocket can articulate over a range of angles from 15 to 45 degrees relative to the holster frame 152 or any similar structure to which the holster is attached via the frame (e.g., mounted with screws or similar fasteners using holes in the holster frame). The rotation of the holster, in association with a higher (or deeper) front pocket region 154, provides a nature lead-in to facilitate a battery being reinserted into the holster 150. The pocket is intentionally less than the full height of the battery, in order to minimize the distance the battery needs to be moved for removal and insertion. And, the pocket may include cut-away regions to allow for easy access to the battery label as well. In one alternative embodiment, a state of charge indicator that may be placed on or near the label in region 190. The pocket recesses also allow the battery label and serial number to be easily accessed for record keeping and maintenance logs.

As illustrated in FIGS. 8 and 9 the system further includes a mechanical latch designed to retain the battery in the holster during use yet permit one-handed removal of the battery (i.e., one hand to both release the latch and withdraw the battery from the holster). More specifically, the housing of removable battery 110 includes a handle 200, and the holster 150 further comprises a latch 300, operatively associated with the power electronics and charger 120 or other structure or device to which the battery holster is mounted. The latch 300 engages the handle 200 of the removable battery 110 when the holster and inserted battery are rotated into a closed position (e.g., FIG. 4). In the embodiment illustrated in the figures (e.g., FIGS. 7-9), latch 300 includes a tab 310 and a catch 320, wherein the tab is an extension of the catch and extends such that the tab, when lifted in the direction of the arrow 330, opens the catch to release the handle 200 from contact with the catch. As will be appreciated from FIG. 7, release of the handle 200 from the catch 310 allows the handle to be pulled or rotated away from the device such that the removable battery can be pivoted within the holster. Once pivoted the battery clears the latch 300 and may be removed from the holster by pulling the battery handle away from the holster, such as in the direction of arrow 352 in FIG. 7. Thus, the disclosed embodiment provides a mechanical latch to retain the battery in operating position rather than simply relying on gravity. One advantage is that the battery, and its associated connection, is not displaced by a change in orientation of the device to which it is attached, and there is a positive action required to remove the battery, thereby avoiding inadvertent removal of the battery and/or loss of battery power. Furthermore, the pivoting holster design permits the battery to be installed in a position beneath other components and does not require an open space above, parallel to an outer surface of the device, for the insertion/removal of the battery. One result of the disclosed embodiment is that the pivoting holster allows the battery to be slid into the holster while closer to horizontal then rotate it up into the latch.

The overall concept creates a battery with an integrated handle that allows the user to easily grab and remove the battery from the system. The battery may be made of molded plastic, and in one embodiment could contain between 9 and 72 18650 cells, where the 18650 cells may employ any chemistry available (e.g., lithium ion at a size of 18 mm by 65 mm). As will be appreciated, the battery may be constructed of different cell types and sizes suitable to meet a particular need. The sides of the battery housing 112 are also scalloped to add extra strength to the overall battery housing and to maintain the cells 114 of the battery in-place during any abusive testing and/or physical use.

The design of the battery housing is also intended to eliminate sharp edges to prevent any injuries when removing and moving battery. For example, the battery corners 440 are over-molded (e.g., rubber) to avoid damage from physical abuse (such as dropping). The over-molds also protect the connector 116 from being damaged during any drop or physical abuse from a user. The battery provides keying features 118 for the connector 116 to avoid misalignment during installation and connection of electrical conductors 117. The battery has a molded standoff rail 119 to aid in easy insertion and removal of the battery from target devices and/or charging systems, they also add extra strength to the casing during physical use. The battery assembly uses screws to aid in repair, replacement and recycling of battery components and cells. The plastic can be molded in any color and of any plastic material available to mold.

Figure 12:
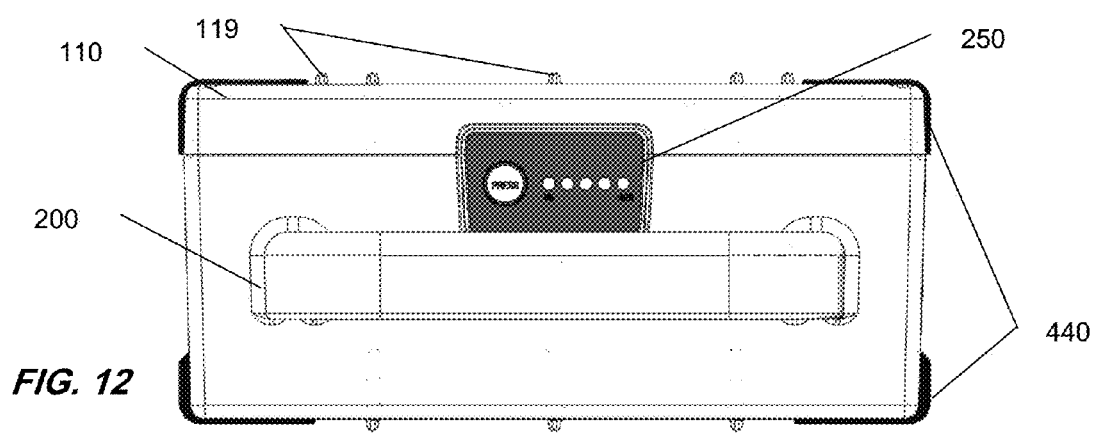
FIG. 12 is a top view of the battery showing a state of charge indicators.
Figure 13:
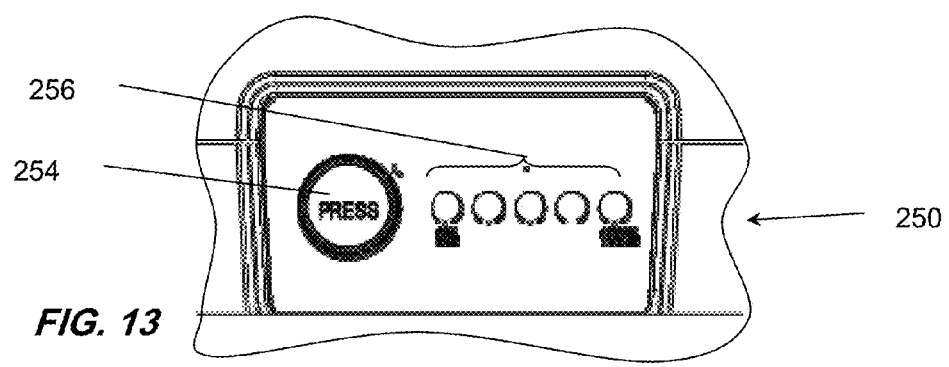
FIG. 13 is an enlarged view of the state of charge indicator.
Figure 14:
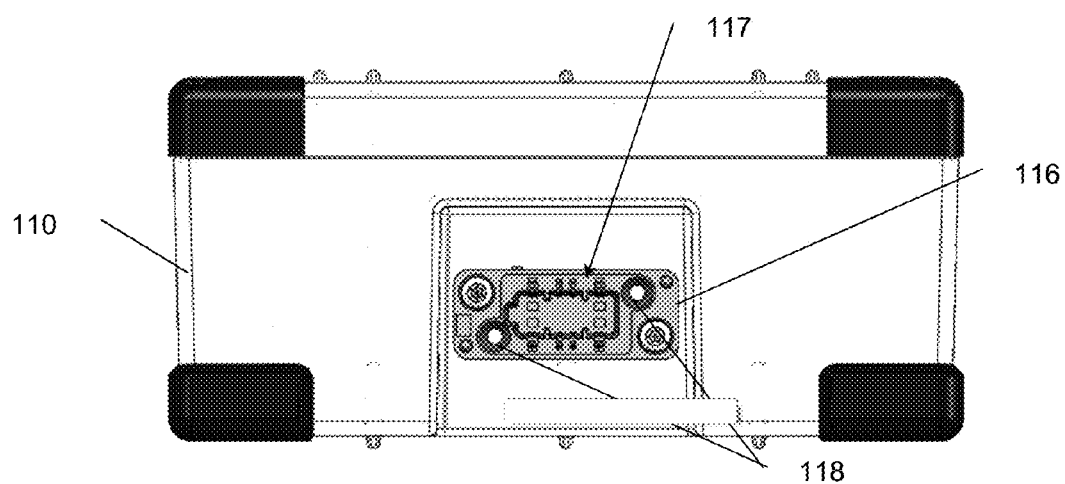
FIG. 14 is a bottom view of the battery in one embodiment, illustrating the electrical connector.

As illustrated in FIGS. 12 and 13, the battery may further include an integrated state of charge indicator (SOCI) 250 with a push button 254 to activate the indicator. Upon activation, SOCI 250 displays the state of charge using one or more of a plurality of indicator LED's 256 (e.g., 5 LEDs shown) to represent the charge level over a range of 0%-100%. As illustrated in FIG. 12, SOCI 250 is located in proximity to the handle and on what would typically, although not necessarily, be the top of the battery near the handle, in order to make the indicator easily viewable when the battery is in use.

The disclosed battery power system may be employed in commercial, industrial, government, or military applications. In one embodiment, the system may be used as a component of a mobile workstation. In such an embodiment, the workstation and removable battery disclosed herein may be moved while a user makes rounds gathering and/or processing data in a hospital or similar healthcare facility or otherwise administering patient care, monitoring, evaluating, etc. Other potential applications include robotics and material handling devices, and it is contemplated that more than one battery and associated holster may be used in some situations.

It should be understood that various changes and modifications to the embodiments described herein will be apparent to those skilled in the art. Such changes and modifications can be made without departing from the spirit and scope of the present disclosure and without diminishing its intended advantages. It is therefore anticipated that all such changes and modifications be covered by the instant application.

What is claimed is:

1. A battery power system for use in providing power to a device, comprising:
   a removable battery including a handle to grab the battery; and
   a battery holster for receiving said battery, where said holster is operatively connected on a surface of a structure associated with the device, and wherein at least a portion of said holster pivots relative to the device to enable removal and insertion of said battery using the handle, said holster further comprising a latch, operatively associated with said device, said latch engaging the handle of the removable battery when the holster is rotated into a closed position.

2. The system according to claim 1, wherein said latch includes a tab and a catch, wherein the tab is an extension of the catch and extends therefrom such that the tab, when lifted, opens the catch to release the handle of the removable battery from contact with the catch.

3. The system according to claim 2, wherein release of the handle from the catch allows the handle to be pulled away from the device such that the removable battery is pivoted with the holster.

4. The system according to claim 1, wherein said removable battery includes a connector on a bottom surface thereof, and where said holster includes a mating connection on the interior thereof, also on said bottom, where the mating connection is electrically connected to the device, and where said battery and holster further include mating alignment guides, such that when said removable battery is slidably inserted into said holster, the connection of the battery and the mating connection of said holster are aligned to permit the respective electrical connections to mate.

5. The system according to claim 1, wherein a housing of said battery further comprises;
    over-molded corners to reduce damage to the battery housing resulting from contact with other objects or surfaces; and
    scalloped sides that retain at least some battery cells within the housing.

6. The system according to claim 5, wherein said latch includes a tab and a catch, wherein the tab is an extension of the catch and extends therefrom such that the tab, when lifted, opens the catch to release the handle of the removable battery from contact with the catch.

7. The system according to claim 6, wherein release of the handle from the catch allows the handle to be pulled away from the device such that the removable battery is pivoted with the holster.

8. The system according to claim 5, wherein said removable battery includes a connector on an exterior of the housing at the bottom, and where said holster includes a mating connection on the interior thereof, also on said bottom, where the mating connection is electrically connected to the device, and where said battery and holster further include mating alignment guides, such that when said removable battery is slidably inserted into said holster, the connection of the battery and the mating connection of said holster are aligned to permit the respective electrical connections to mate.

9. The system according to claim 1, wherein said removable battery further comprises an integrated state of charge indicator, electrically connected to the battery, said state of charge indicator including a push button switch to activate, where upon activation the state of charge indicator displays the state of charge for a period of time.

10. A battery holster for holding a removable battery having a battery housing, said battery housing including a handle, the holster comprising:
    a battery pocket for receiving said battery housing, wherein the handle of the battery housing remains at least partially exposed when said battery housing is received in said battery pocket and where at least a portion of said pocket pivots to enable removal and insertion of said battery housing in the holster, and
    a latch, operatively associated with the holster, said latch engaging the handle of the battery housing when said pocket is rotated into a closed position,
    wherein the battery holster is mounted on an exterior surface of an electronic device.

11. The battery holster according to claim 10, wherein said handle may be disengaged from said latch and the battery housing removed by a single hand while concurrently grasping the handle.

12. The battery holster according to claim 11, wherein said latch includes a tab and a catch, wherein the tab is an extension of the catch and extends therefrom such that the tab, when lifted, opens the catch to release the handle from contact with the catch.

13. The battery holster according to claim 10, wherein the housing of said battery further comprises over-molded corners.

14. The battery holster according to claim 10, wherein the housing of said battery further comprises scalloped sides that retain at least one battery cell within the housing.

* * * * *